(12) United States Patent
Cheney et al.

(10) Patent No.: US 11,430,471 B1
(45) Date of Patent: Aug. 30, 2022

(54) PARTIAL ADJUSTMENT OF DISK DRIVE AREAL DENSITY TO COMPENSATE FOR HEAD OR SURFACE DEGRADATION

(71) Applicant: Seagate Technology LLC, Fremont, CA (US)

(72) Inventors: Drew Allen Cheney, Mound, MN (US); Edward Charles Gage, Edina, MN (US); Praveen Viraraghavan, Fort Collins, CO (US)

(73) Assignee: Seagate Technology, Fremont, CA (US)

( * ) Notice: Subject to any disclaimer, the term of this patent is extended or adjusted under 35 U.S.C. 154(b) by 0 days.

(21) Appl. No.: 17/127,420

(22) Filed: Dec. 18, 2020

(51) Int. Cl.
*G11B 5/455* (2006.01)
*G11B 20/18* (2006.01)
*G11B 20/10* (2006.01)

(52) U.S. Cl.
CPC ........ *G11B 5/455* (2013.01); *G11B 20/10388* (2013.01); *G11B 20/18* (2013.01); *G11B 2020/1869* (2013.01); *G11B 2220/211* (2013.01); *G11B 2220/2533* (2013.01)

(58) Field of Classification Search
CPC ......... G11B 5/82; G11B 5/584; G11B 5/5921; G11B 5/5922; G11B 15/1841; G11B 15/473; G11B 20/833; G11B 5/58; G11B 5/012; G11B 19/2072; G11B 2220/2516; G11B 20/1258; G11B 5/743; G11B 27/36; G11B 5/455; G06N 17/005
USPC .......................................... 360/53, 48, 75, 31
See application file for complete search history.

(56) References Cited

U.S. PATENT DOCUMENTS

| | | | |
|---|---|---|---|
| 9,070,390 B2 * | 6/2015 | Green | G11B 27/36 |
| 9,304,930 B2 * | 4/2016 | Shu | G06F 3/0619 |
| 9,355,680 B1 | 5/2016 | Jin et al. | |
| 10,748,582 B1 | 8/2020 | Feist | |

* cited by examiner

*Primary Examiner* — Nabil Z Hindi
(74) *Attorney, Agent, or Firm* — Mueting Raasch Group

(57) ABSTRACT

A disk drive is operable to determine degradation associated with writing to a disk surface by a head which has written existing data at a first areal density. A second areal density less than the first areal density is determined that remediates the degradation. The disk drive performs subsequent writes to the disk surface at the second areal density, and continues to read the existing data at the first areal density.

18 Claims, 5 Drawing Sheets

PARTIAL ADJUSTMENT OF DISK DRIVE AREAL DENSITY TO COMPENSATE FOR HEAD OR SURFACE DEGRADATION

SUMMARY

The present disclosure is directed to a method, system, and apparatus that facilitate partial adjustment of disk drive areal density to compensate for head or surface degradation. In one embodiment, a disk drive includes a read channel coupled to a head used to read and write existing data to a disk surface at a first areal density. The disk driver includes a controller coupled to the read channel that is operable to determine degradation associated with writing to the disk surface by the head at the first areal density. The controller determines a second areal density less than the first areal density that remediates the degradation, and performs subsequent writes to the disk surface at the second areal density. The controller will continue to read the existing data at the first areal density.

In another embodiment, a method involves writing existing data on a disk surface via a head at a first areal density and determining degradation of at least one of the disk surface and the head at the first areal density. A second areal density less than the first areal density is determined that remediates the degradation. Subsequent writes to the disk surface are performed via the head at the second areal density and the existing data continues to be read at the first areal density via the head.

In another embodiment, a system includes a host computer and a disk drive. The disk drive has a host interface coupled to the host computer and a head used to read and write existing data on a disk surface at a first areal density in response to storage command from the host. The disk drive includes a controller coupled to the head that is operable to determine degradation associated with writing to the disk surface by the head at the first areal density and communicate the degradation to the host. In response to the communication of the degradation by the disk drive, the host instructs the disk drive to perform subsequent writes to the disk surface at a second areal density and continue to read the existing data at the first areal density.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
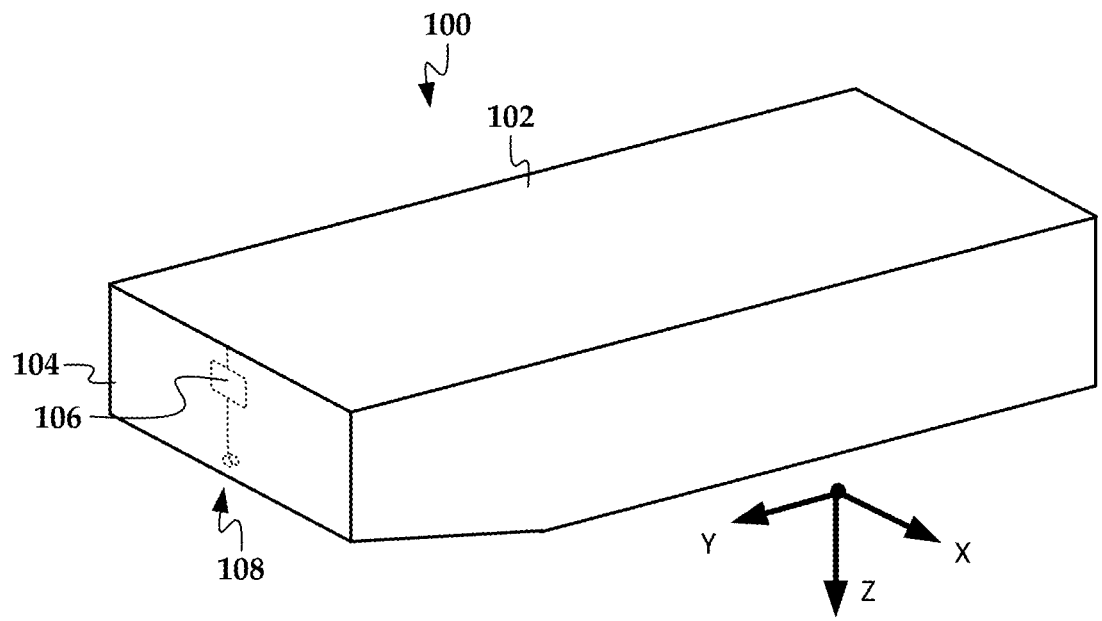
FIG. 1 is a diagram of a read/write head according to an example embodiment.

The present disclosure generally relates to data storage devices that utilize magnetic storage media, e.g., magnetic disks. For example, a hard disk drive (HDD) unit contains one or more magnetic disks that are written to and read from using a magnetic read/write head attached to the end of an arm that is positioned over tracks in the disk. To record data, the read/write head generates magnetic fields using a magnetic coil, the fields being directed to the magnetic disk surface via a write pole. To read data, the read/write head senses changes in magnetic field via a sensor such as a magneto-resistive stack that is held proximate to the moving disk. A disk drive typically has multiple heads, one for each disk surface.

A disk drive that uses just the write coil and write pole to record data is sometimes referred to as a conventional magnetic recording (CMR) drive. Modern CMR drives often employ perpendicular magnetic recording (PMR), in which the magnetic fields are aligned perpendicularly to the disk surface. This allows for higher areal density (AD) compared to schemes where the fields are parallel to the disk surface. Some drives may employ additional means to increase AD, such as shingled magnetic recording (SMR) in which adjacent tracks are layered upon one another during writing. Other technologies employed to increase AD include heat-assisted magnetic recording (HAMR) and microwave-assisted magnetic recording (MAMR). These technologies use additional components (e.g., laser for HAMR and spin-torque oscillator for MAMR) to reduce the size of the recorded region such that smaller bits can be written to the disk compared to a CMR drive.

Whatever technology is used to record data to a magnetic disk, there is a desire to increase AD such that an individual magnetic disk can store ever-larger amounts of data. Because the data is typically written on circular tracks, increased AD can be achieved by writing narrower tracks with correspondingly narrower spacing between adjacent tracks. Technologies such as HAMR and MAMR allow recording these narrower tracks, and advanced read transducers have been developed that can read the narrower tracks.

Over the service life of an HDD, the disk surface's write or read capability may degrade over time. This is often due to degradation of the read/write head that is used to read from and write to the surface, although the characteristics of the disk surface (e.g., high surface asperity) may contribute to the degradation. If the surface's write or read capability degrades below an acceptable condition (bit error rate, required laser power, etc.) that surface would normally no longer be usable and result in the removal of that surface (via remanufacture, or reman) or the entire drive from service.

Rather than entirely removing the surface or drive from service, embodiments described herein enable continued use of the degraded surface by executing future writes at a lower linear density. The lower density writes can improve the bit error rate such that the head can continue in service and its useful life can be extended. The lower density would reduce the surface's reported capacity. In the case of heat assisted magnetic recording (HAMR), the reduced linear density could also result in a lower applied laser current which could slow the degradation of the surface and further prolong its life.

In reference now to FIG. 1, a perspective view shows a read/write head 100 according to an example embodiment. The read/write head 100 may be used in a magnetic data storage device, e.g., hard disk drive, having features described herein. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 may be a CMR head, or may be configured as a HAMR or MAMR device. In the latter case, the head includes additional components that assist the read/write transducer 108 during recording. These components are generally indicated by block 106 and may include a laser diode and a waveguide in a HAMR implementation, or a spin-torque oscillator for a MAMR device. Note that the general concepts described herein related to changing of linear density can be implemented in a CMR device and assisted magnetic recording devices.

Figure 2:
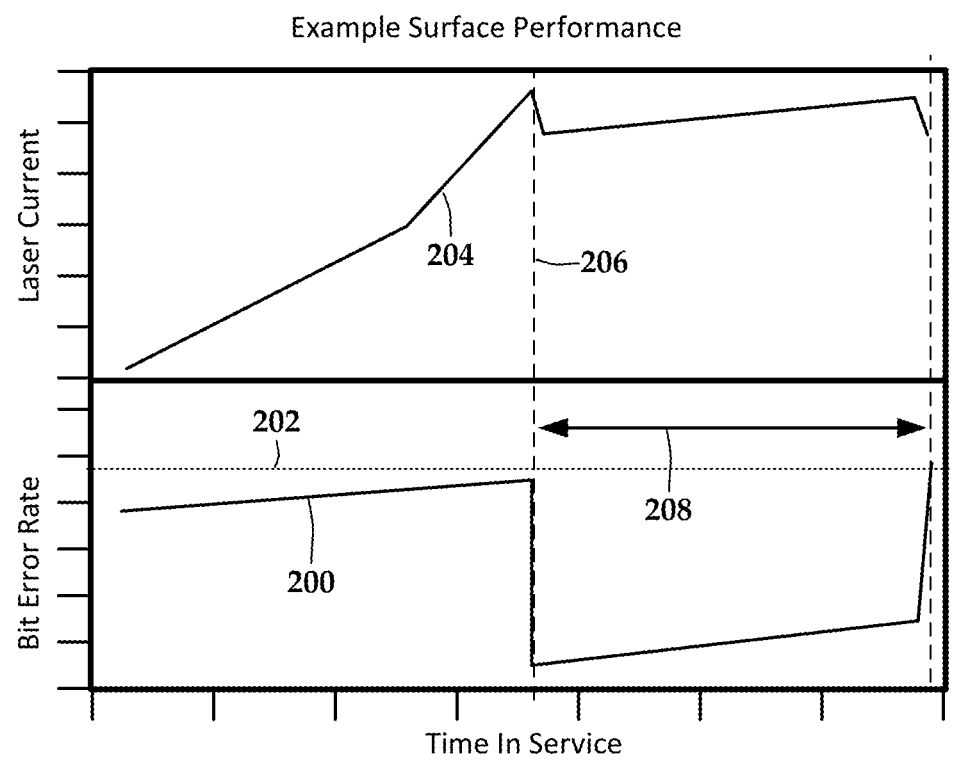
FIGS. 2 and 3 are graphs showing estimated performance results for a disk drive according to an example embodiment.
Figure 3:
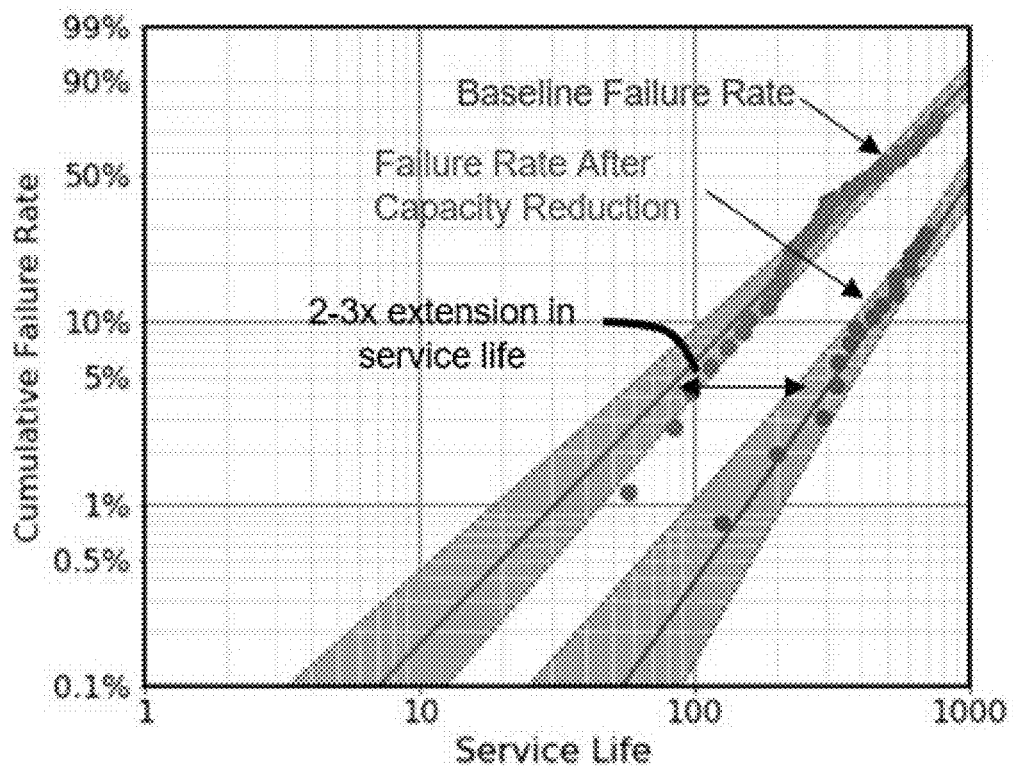

A study was conducted to assess this concept. In FIG. 2, a graph illustrates performance measures of a drive surface and a HAMR head according to an example embodiment. As indicated be trace 200, the bit error rate (BER) of the head is increasing during use and has reached or will soon reach a failure threshold 202. As indicated by trace 204, this is also accompanied by an increase in laser power up until time 206. Before or when the threshold 202 is reached, linear density is reduced at time 206, e.g., by a target of 40% in this example, in order to extend surface life by an estimated amount of time 208. An alternative laser optimization scheme was also trialed which was used to slow the degradation rate after the linear density was reduced. This can be seen by a slight reduction in laser power at trace 204 after time 206. The results of the analysis validated the concept and showed that for a given head, capacity reduction can significantly extend life of the head. In FIG. 3, a graph shows analysis results of a population of heads in which a linear reduction scheme according to an example embodiment was applied. Over the entire population in the analysis, characteristic life was extended by a factor of 2-3×.

Note that reduction in laser power will generally result in narrower written tracks, as lower laser power can tend to reduce the size of the hotspot, all other things being equal. The drive can compensate for this by decreasing linear bit density along the track, often measured in bits per inch (BPI). This can give the reader and read channel more time to detect each bit transition along the track. In other embodiments, the track-to-track spacing can be the same or increased together with narrowing the tracks. This can reduce adjacent track interference (ATI), thus helping to compensate for narrower data tracks. Note that the ATI can decrease even if the number of tracks per inch (TPI) remains the same after decreasing track width, as the narrower tracks would tend to leave more unwritten space between tracks.

In a non-HAMR embodiment, the drive can attempt to write wider tracks instead of or in addition to changing BPI of the written data. Writing wider tracks may lead to an decrease in TPI of the newly written tracks. In some embodiment, the drive could write to a different format to help balance TPI with wider tracks. For example, a technology known as shingled writing overlaps successive tracks on each other. This allows writing narrow tracks using a conventional writer, although can result in a penalty in ability to perform random updates of written data. Another similar writing technology known as interlaced magnetic recording (IMR) may be used, in which two tracks (bottom tracks) are written with a large track-to-track spacing, and a subsequent track (top track) is written between them. This can provide some of the advantages of shingled writing while reducing the impacts on random updates.

In some embodiments, a drive can continually evaluate performance of each drive surface and perform remanufacture (reman) operations if the health of the head at that surface goes below some threshold. Generally, reman may involve a number of options depending on the state of the head. One option is to continue to use the unwritten regions of the drive surface for read and writes, with new writes at a different areal density capacity (ADC) setting (e.g., linear bit density, track width and density) that accounts for the degraded condition. This may also or in the alternate include writing in a different track format, e.g., shingled or interlaced recording. In this option, the increase in capacity and/or change in format may reduce total ADC of the drive surface. In some embodiment, spare capacity may be obtained elsewhere to compensate for the lost capacity. Another option is to retain data already written to the surface, but not to use the surface for and further writing. A third option is to stop further use of the surface, and migrate and data already on the surface to another surface if possible.

In a more specific example, every surface/head may be given a health grade, A-F. The criteria for the grades are shown in Table 1 below.

TABLE 1

| Grade | Criteria |
|-------|----------|
| A | Acceptable ADC margin (e.g., 5%) |
| B | Capable of write and read with adequate data recovery |
| C | Not acceptable for write and designated for reman |
| D | Write remanned |
| E | Surface is unwritable |
| F | Surface is unreadable |

The surface with grade D has had its write linear density reduced and any write command to this surface will use the lower density. When required and/or available, this may involve using spare capacity to maintain drive capacity at or near its advertised vale. For example, the drive may have X % of additional spares to address LBA remapping where X is between 2 and 11. Any writes to a C grade surface will involve a reman and the assignment to a D grade. Note that the drive surface need not transition through each grade in order. For example, if the read transducer at the surface fails, then that surface could go directly from an A to an F.

In some embodiments, the drive may not have capacity that is expressly designated spare capacity, e.g., space on the disk that is usable but not currently mapped to a logical block address. However, some currently used surfaces could be reconfigured to free up capacity to compensate for a reman operation as described herein. For example, the areal density (e.g., linear density) of a grade A surface could be increased to offset the capacity loss on the degraded surface. This could be accomplished similarly to the reman operations described in the FIGS. 4-6 that follow. For example, already written data could be kept at its original areal density and newly written data could be written at the new, higher areal density.

Figure 4:
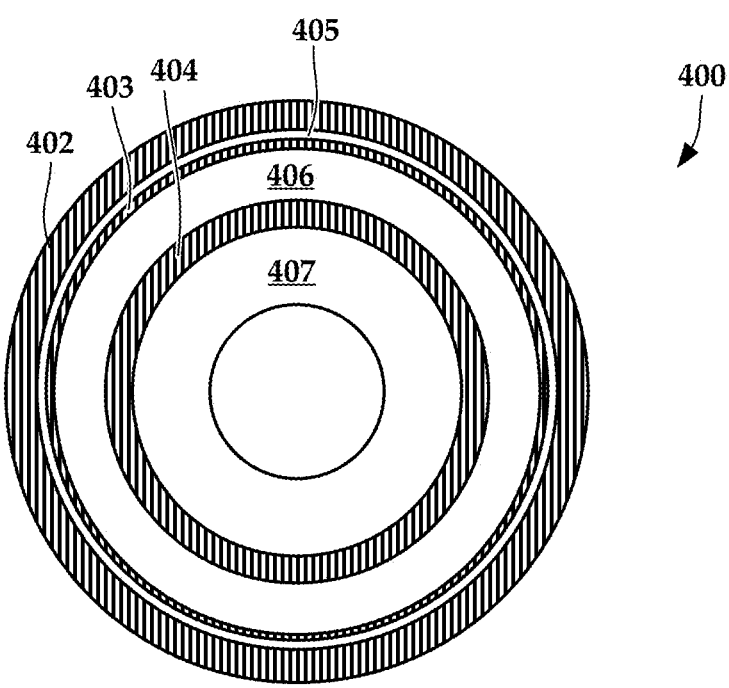
FIGS. 4, 5, and 6 are diagrams showing reallocation of areal density on a disk surface according to example embodiments.

In FIG. 4, a diagram illustrates an example of a disk surface reman according to an example embodiment. In this figure, a disk surface 400 has regions 402-404 in which data has been written, as indicated by the vertical hatching. No data is written to the white region 405 between the two outer portions 402, 403 nor is data written in white regions 406 and 407. The written regions 402-404 may be separated by unwritten regions as shown for a number of reasons. For example, the disk surface 400 could be divided into different partitions that are treated by the host as different drives, and the data is written starting at the outermost tracks of each partition. Even if the surface 400 is not partitioned, the host may write often-accessed data (e.g., file system metadata) at various regions spread across the disk surface to minimize average seek time over the life of the drive. Other actions such as large file erasure can also result in large gaps between written regions.

At the state shown in FIG. 4, the drive surface experiences a write degradation (e.g., grade C in Table 1). The data written in regions 402-404 may still be readable, and therefore the already written tracks in these regions may continue to be accessed for future read requests at the original, higher areal density. If a request is made to overwrite the tracks, e.g., perform an update on a file, this may still be allowed depending on the condition of the read/write head and the size of the update. In other embodiments, the regions 402-404 may be treated as read-only.

Figure 5:
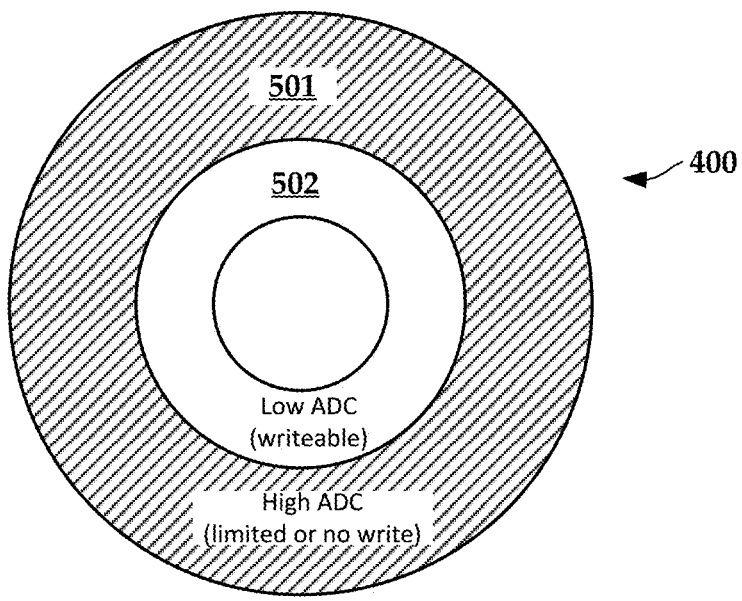

At least some of the regions 405-407 may be reused at a lower ADC in order to reduce the impact in loss of capacity compared to treating the whole surface 400 as a loss. Generally, this may involve remapping logical block addresses formerly associated with any reused regions to account for the loss of ADC. Depending on the complexity desired for remapping, this may involve using only some of the regions. For example, one way to treat the different regions is to map some of the already-written regions to a high-ADC zone, which may allow for little or no writing to the zone, and map the other regions to a lower ADC zone in which writing can be performed. In FIG. 5, a diagram shows a first remapping scheme for the disk surface 400 according to an example embodiment. Regions 402-406 are mapped to a high ADC, limited-write, zone 501, and region 407 is mapped to a low ADC, writeable zone 502. Note that in this arrangement, the storage capacity of regions 405 and 407 may be lost as they are included in the limited or no write zone 501.

Figure 6:
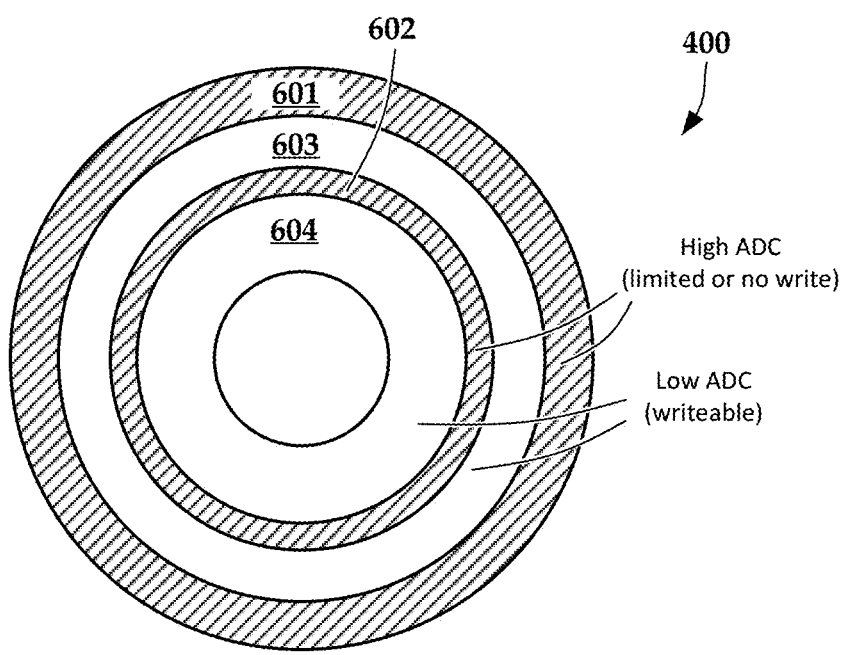

In FIG. 6, a diagram shows a second remapping scheme for the disk surface 400 according to another example embodiment. Regions 402, 403, and 405 are mapped to a first high ADC, limited-write, zone 601, and region 404 is mapped to a second high ADC, limited-write, zone 602. Region 406 is mapped to a first low ADC, writeable zone 603 and region 407 is mapped to a second low ADC, writeable zone 604. Note that in this arrangement, the storage capacity of region 405 is lost as it is included in the limited or no write zone 601, although this may be an acceptable tradeoff if the desire is to limit the total number of newly created zones. Otherwise, each region 402-407 could be mapped to an individual high or low ADC zone as appropriate.

As noted above, the operations similar to those described in FIGS. 4-6 can be used to map new data regions to new, higher ADC zones in a good quality (e.g., grade A) surface. This provides an increase in storage capacity that can be used to compensate for the reduction in ADC for reman that occurred on another surface of the drive. Already-written data will be maintained in one or more lower ADC zones. In such a case, the already written lower ADC zones need not be limited-write zones, as the surface is known to be capable of reliably writing at the lower ADC.

In a conventional drive controller, the drive itself may not have knowledge of the different regions as shown in FIG. 4. While the drive controller will have processed the write commands that result in the written areas 402-404, the drive controller will not know what data this was associated with, or whether the data was subsequently erased, as a file erasure by the host operating system will not usually erase the data of a file, but will just clear metadata of the file such that the LBAs used by the file can be subsequently re-used. Generally, it is the host that tracks the structures that define the data written to the disk surface 400, including drive partitions, user files, virtual memory sections, etc.

Thus, in some embodiments, the host machine that is coupled to the drive will accomplish the reman operations described herein. The host could be a dedicated drive controller card that manages one or more drives (e.g., a RAID controller) or be a general-purpose computer that manages the drive through its operating system. In this configuration, the drive and host may have extended set of messages to communicate the state/grade of the different disk surfaces, as well as to cause the controller to write at different ADC by request of the host.

In some embodiments, the drive may have internal control and mapping of data to its own disk. For example, in an object storage drive, the host may cause read and write operations to be defined on the drive in terms of object identifiers instead of LBAs. In such a configuration, the drive will store the objects using its own address mapping, and therefore will have knowledge of the written areas as shown in FIG. 4. In such a case, the drive can perform a reman operation as shown in FIGS. 5 and 6 on its own and independent of the host.

The remapping of some of a drive surface to a lower ADC configuration may ultimately result in loss of data storage capacity for the drive as a whole. This can be partially or fully offset by reallocating spare storage space in the drive to compensate for loss of ADC in the remanned surface. For example, the drive may be overprovisioned from the factory for purposes such as compensating for bad sectors that may be found during the life of the drive. Both the affected disk surface and other disk surfaces of the drive may be overprovisioned.

The drive may have other data storage space that is not originally mapped to host LBAs that is used for the drive's own internal use. This spare data storage space may be on the same disk surface and/or other disk surfaces. An example of this is a media cache, in which the drive performs writes data to reserved parts of the disk surface. For example, a number of random write requests can be quickly written sequentially to the media cache during times of high activity. This data can then be moved to the target locations when activity levels have decreased. The media cache regions can be repurposed for user data, which may impact write performance but offsets data lost due to a surface reman.

The drive may attempt to balance the decrease in ADC to compensate for a degraded surface with the availability of spare storage area. For example, assume a disk surface is remanned resulting in a 20% reduction in capacity due to the decrease in areal density for some portion of the disk and the non-usability of other portions for writing new data. If the disk surface can store N-bytes of data, then the device may attempt to find 0.2*N bytes of spare data storage that can be repurposed to compensate for the loss of storage due to the reman.

Figure 7:
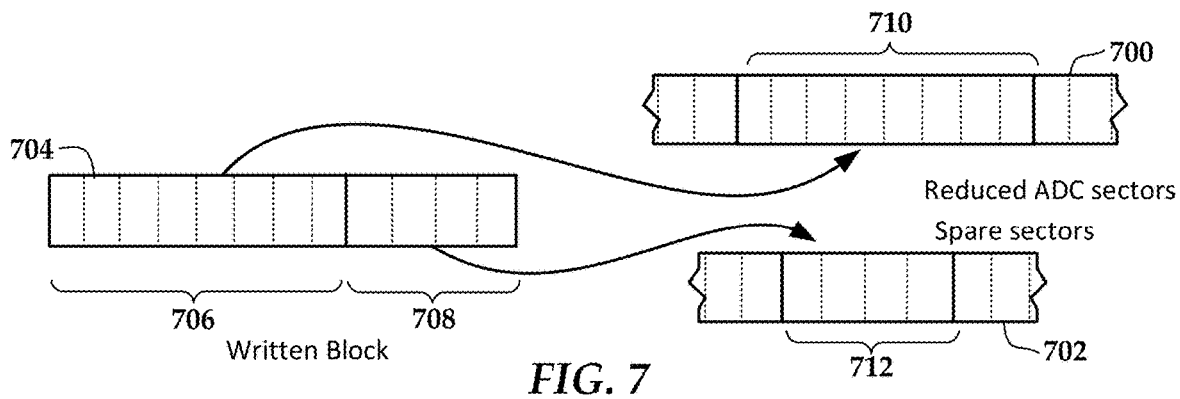
FIG. 7 is a diagram showing use of spare storage with a reduced areal-density disk surface according to an example embodiment.

In FIG. 7, a block diagram illustrates how writes directed to a remanned disk surface can utilize spare storage according to an example embodiment. Data region 700 represents a data storage surface in which ADC has been reduced due to reman. This may result, for example, in a reduced number of sectors per track in the region 700. Region 702 represents a spare storage area that has been recovered from the same or different surface of the drive. Assume the reduction in storage of region 700 is A times the original ADC, where 0<A<1. Block 704 represents a block of data to be written to the region 700. Assuming block 704 has on B units of data (e.g., sectors, bytes, etc.) a first portion 706 of block 704 having size A*B units of data are written to portion 710 of the degraded surface region 700. A second portion 708 of block 704 having size (1−A)*B is written to portion 712 of the designated spares region 702.

Figure 8:
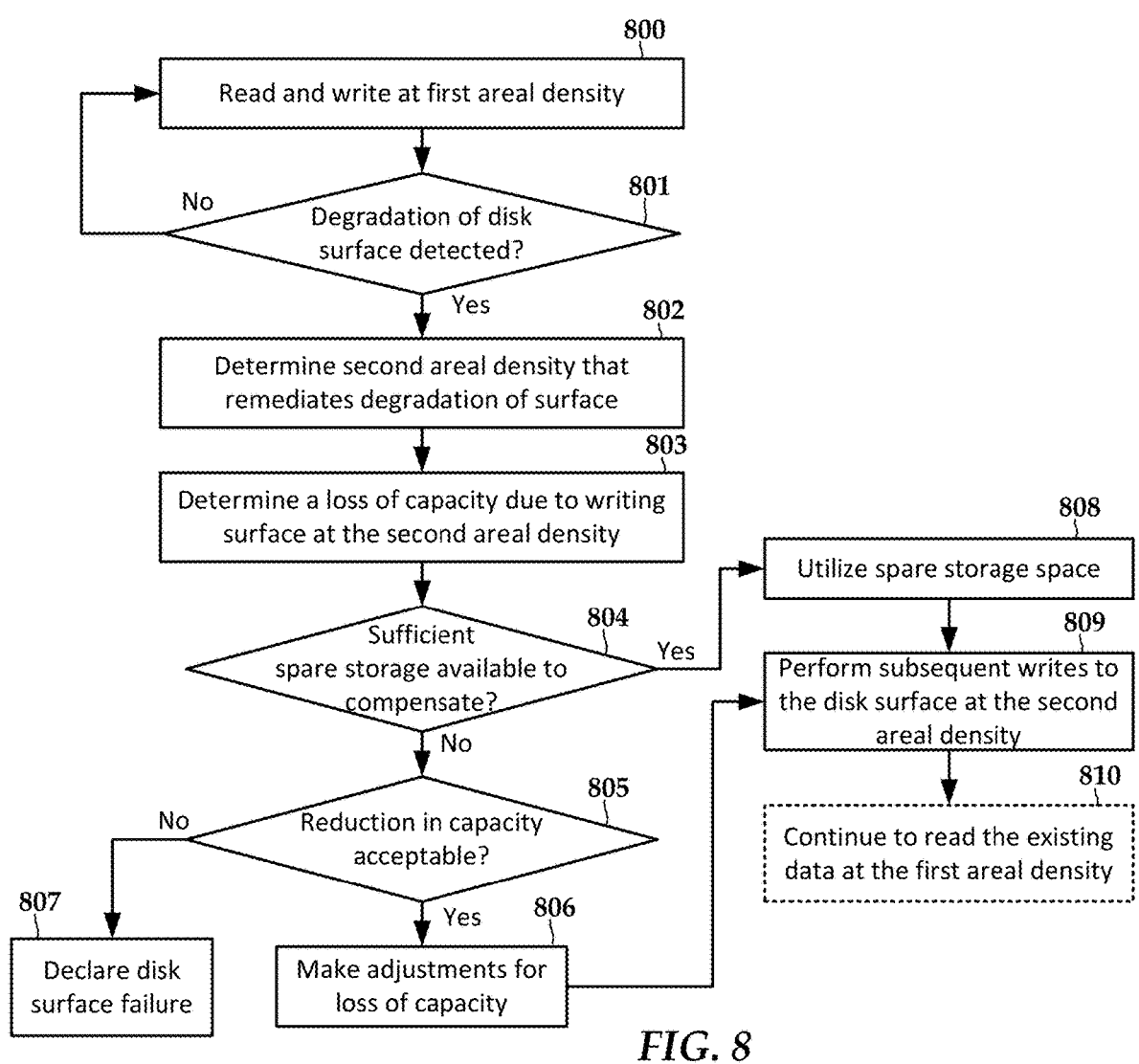
FIG. 8 is a flowchart of a method according to an example embodiment.

In FIG. 8, a flowchart shows a method according to an example embodiment. The method may be implemented by a disk drive that writes 800 data on a disk surface via a head at a first areal density. A host coupled to the disk drive and/or the disk drive itself may initiate some of the illustrated processes. The disk surface may have different zones with different areal densities, and thus the writing 800 may apply to all such zones at the different first areal densities. If a degradation of at least one of the disk surface and the head is determined 801, then a second areal density is determined 802. The second areal density is less than the first areal density and is found to remediates the degradation. The second areal density may be determined 802, for example, by writing test tracks at different TPI and BPI values, and reading back the test tracks and comparing some quality metric, e.g., bit error rate. Note that where the disk surface has multiple areal density zones, this may involve changing all of the zones from different first to second areal densities.

Assuming that the second areal density is determined 802, then a loss of capacity due to writing surface at the second areal density is determined 803. The loss of capacity may due to writing currently unused regions of the disk surface while retaining already written data at the same density, or may involve moving already written data on the disk surface elsewhere and changing the entire surface to use the second areal density. In response to determining 803 the loss of capacity, the disk drive and/or host determines 804 whether there is sufficient spare storage to compensate for the loss of capacity. If there is sufficient spare storage, then the spare storage is utilized 808 (e.g., as shown in FIG. 7) and the host/drive performs 809 subsequent writes to the disk surface via the head at the second areal density. Optionally, the host/drive may continue to read 810 the existing data at the first areal density via the head. The regions where the existing data was written may be declared a read-only zone, or it may be declared a write-limited zone, where existing data can be updated, but no new tracks and sectors can be written.

If block 804 returns 'no,' then the drive and/or host may still determine 805 whether a loss of capacity is acceptable. In some cases, the host may not need the full advertised capacity of the drive, and may be willing to sacrifice some advertised capacity in order to avoid performing more involved remediation of a failed surface, which may occur at block 807 if block 805 returns 'no.' In some situations the disk drive may be able to make the determination 805 on its own, e.g., where the drive is allowed to reduce its advertised capacity.

If the host and/or drive can accept a lowering of capacity (block 805 returns 'yes), then the host and/or drive may make appropriate adjustments. For example, a range of LBAs could be marked as bad sectors or the like, thus taken out of use. This allows the host to correctly ascertain remaining storage capacity due to the changes to the affected surface. Thereafter, the host/drive performs 809 subsequent writes to the disk surface via the head at the second areal density and optionally continues to read 810 the existing data at the first areal density via the head.

Figure 9:
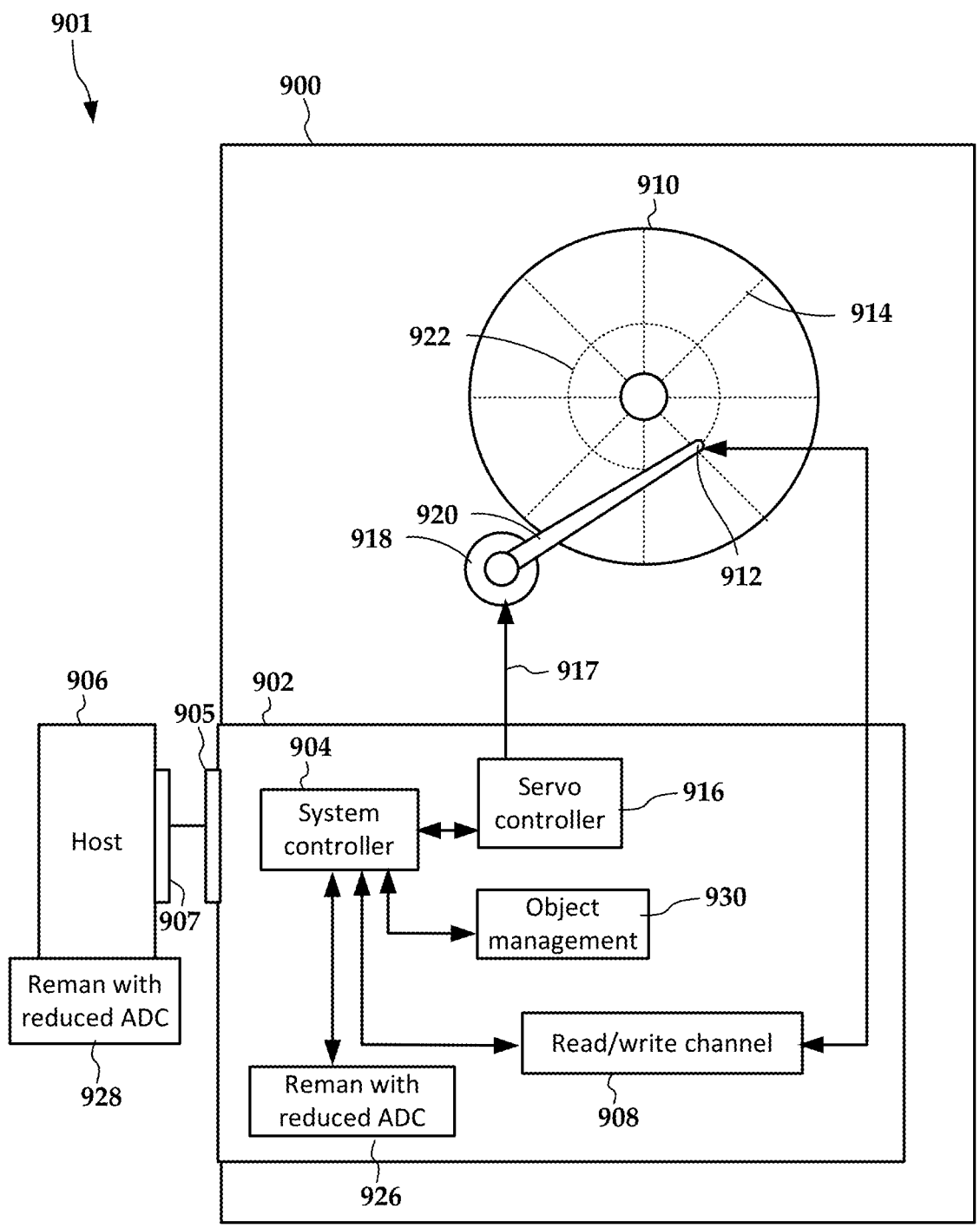
FIG. 9 is a block diagram of a system and apparatus according to an example embodiment.

In FIG. 9, a block diagram illustrates a system 901 that include a disk drive apparatus 900 and host computer 906 according to an example embodiment. The host computer 906 may be any electronic device that can be communicatively coupled to store and retrieve data from a data storage device, e.g., a desktop or server computer, storage controller card, etc. Control logic circuit 902 of the disk drive 900 includes a system controller 904 that processes read and write commands from the host computer 906, which is coupled via a host interface 905. The host interface 905 includes mechanical, electrical, and software interfaces known in the art, such as SATA, SaS, NVMe, Ethernet, etc. The host device 906 may include one or more compatible host interfaces 907.

The system controller 904 is coupled to a read/write channel 908 that reads from and writes to a surface of a magnetic disk 910. The read/write channel 908 generally converts data between the digital signals processed by the controller 904 and the analog signals conducted through one or more read/write heads 912 during read operations. To facilitate the read operations, the read/write channel 908 may include analog and digital circuitry such as preamplifiers, filters, decoders, digital-to-analog converters, timing-correction units, etc. The read/write channel 908 also provides servo data read from servo wedges 914 on the magnetic disk 910 to a servo controller 916. The servo controller 916 uses these signals to provide a voice coil motor (VCM) control signal 917 to a VCM 918. The VCM 918 rotates an arm 920 upon which the read/write heads 912 are mounted in response to the voice coil motor control signal 917.

Data within the servo wedges 914 is used to detect the location of a read/write head 912 relative to the magnetic disk 910. The servo controller 916 uses servo data to move a read/write head 912 to an addressed track 922 and block on the magnetic disk 910 in response to the read/write commands (seek mode). While data is being written to and/or read from the disk 910, the servo data is also used to maintain the read/write head 912 aligned with the track 922 (track following mode).

The disk drive 900 includes a reman module 926 that tracks degradation affecting surfaces of the disk 910. The module 926 can triggers a reman that reduces ADC for future writes on at least part of the affected disk surface. This may involve performing some or all of the processes shown in FIG. 8, for example. A reman module 928 is shown operating on the host 906, which may perform some of the operations described for module 926. Generally, the disk drive 900 may be suited to monitoring and detecting degradation via firmware, while the host 906 may be suited to tracking remediation actions, as the host 906 will have knowledge of how the disks are partitioned, how the existing and future data is written and used, etc. As such, the disk drive 900 and host 906 may utilize a messaging protocol via the host interface 905 that allows communication of surface status, instructions that cause the drive to change ADC of particular regions and/or HAMR write parameters, etc.

In some embodiments, the disk drive 900 may be an object-based drive, in which the drive 900 manages data as objects instead of LBAs. This is indicated by object management module 930. In an object based drive, the host 906 will cause data to be written and read via object identifiers, leaving the disk drive 900 to decide what internal logical or physical addresses are used to store the objects. In such a configuration, the disk drive 900 may be able to perform the reman operations described above entirely on its own, as the drive 900 is free to move objects to different addresses, remap addresses to different locations, etc.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A disk drive, comprising:
   a read channel coupled to a head used to read and write existing data to a disk surface at a first areal density; and
   a controller coupled to the read channel and operable to:
     determine a degradation associated with writing to the disk surface by the head at the first areal density, the degradation limiting a service life of the disk surface;
     determine a second areal density less than the first areal density that remediates the degradation, wherein the disk surface is divided into a first zone comprising the existing data at the first areal density and a second zone at the second areal density;
     perform subsequent writes to the disk surface at the second areal density; and
     continue to read the existing data at the first areal density.

2. The disk drive of claim 1, wherein the first zone is designated as read-only after the degradation is determined.

3. The disk drive of claim 1, wherein the first zone is designated as limited-write after the degradation is determined such that the existing data in the first zone can be updated but no new tracks are written to the first zone.

4. The disk drive of claim 1, wherein the controller is further operable to:
   determine a loss of capacity due to the subsequent writes to the disk surface at the second areal density; and
   utilize a spare storage of the disk drive to compensate for the loss of capacity.

5. The disk drive of claim 4, wherein the spare storage is obtained by increasing an areal density of another disk surface of the disk drive.

6. The disk drive of claim 1, further comprising a host interface operable to communicate with a host computer, wherein the host computer instructs the disk drive to perform the subsequent writes to the disk surface at the second areal density and to continue to read the existing data at the first areal density.

7. The disk drive of claim 1, wherein the degradation is due to aging of one of the head and the disk surface.

8. A disk drive, comprising:
   a read channel coupled to a heat-assisted magnetic recording (HAMR) head used to read and write existing data to a disk surface at a first areal density; and
   a controller coupled to the read channel and operable to:
     determine a degradation associated with writing to the disk surface by the HAMR head at the first areal density, the degradation limiting a service life of the disk surface;
     determine a second areal density less than the first areal density that remediates the degradation;
     perform subsequent writes to the disk surface at the second areal density, wherein performing the subsequent writes to the disk surface at the second areal density allows the HAMR head to write at a lower laser power than at the first areal density; and
     continue to read the existing data at the first areal density.

9. A method, comprising:
   writing existing data on a disk surface via a head at a first areal density;
   determining a degradation of at least one of the disk surface and the head at the first areal density, the degradation limiting a service life of the disk surface;
   determining a second areal density less than the first areal density that remediates the degradation;
   dividing the disk surface into a first zone comprising the existing data at the first areal density and a second zone at the second areal density;
   performing subsequent writes to the disk surface via the head at the second areal density; and
   continuing to read the existing data at the first areal density via the head.

10. The method of claim 9, wherein the first zone is designated as read-only after the degradation is determined.

11. The method of claim 9, wherein the first zone is designated as limited-write after the degradation is determined such that the existing data in the first zone can be updated but no new tracks are written to the first zone.

12. The method of claim 9, further comprising:
    determining a loss of capacity due to the subsequent writes to the disk surface at the second areal density; and
    utilizing a spare storage to compensate for the loss of capacity.

13. The method of claim 9, wherein the performance of the subsequent writes to the disk surface at the second areal density and the continued reading of the existing data at the first areal density occurs in response to commands of a host computer coupled to a disk drive that comprises the disk surface and the head.

14. The method of claim 9, wherein an object storage drive comprises the disk surface and the head, and wherein the object storage drive internally manages the performing of the subsequent writes to the disk surface at the second areal density and the continuing to read the existing data at the first areal density.

15. The disk drive of claim 8, wherein the disk surface is divided into a first zone comprising the existing data at the first areal density and a second zone at the second areal density, wherein the first zone is designated as read-only or limited-write after the degradation is determined, wherein in limited-write the existing data in the first zone can be updated but no new tracks are written to the first zone.

16. The disk drive of claim 8, wherein the controller is further operable to:
- determine a loss of capacity due to the subsequent writes to the disk surface at the second areal density; and
- utilize a spare storage of the disk drive to compensate for the loss of capacity.

17. The disk drive of claim 16, wherein the spare storage is obtained by increasing an areal density of another disk surface of the disk drive.

18. The disk drive of claim 8, wherein the degradation is due to aging of one of the head and the disk surface.

\* \* \* \* \*